United States Patent [19]
Fernandez et al.

[11] Patent Number: 5,843,485
[45] Date of Patent: Dec. 1, 1998

[54] VALVE-GATE BUSHING FOR GAS-ASSISTED INJECTION MOLDING

[75] Inventors: Vernon Fernandez, Rochester Hills; Eric J. Seres, Holly, both of Mich.

[73] Assignee: Incoe Corporation, Troy, Mich.

[21] Appl. No.: 673,347

[22] Filed: Jun. 28, 1996

[51] Int. Cl.⁶ .................................................. B29C 45/23
[52] U.S. Cl. ..................... 425/130; 264/328.8; 264/572; 425/546; 425/566; 425/573
[58] Field of Search .................... 425/533, 546, 425/564, 566, 573, 130, 131.5; 264/328.8, 328.12, 572

[56] References Cited

U.S. PATENT DOCUMENTS

| | | | |
|---|---|---|---|
| 3,397,426 | 8/1968 | Fujita et al. | 425/131.5 |
| 4,106,887 | 8/1978 | Yasuike et al. | 425/549 |
| 4,474,717 | 10/1984 | Hendry | 264/572 |
| 4,740,150 | 4/1988 | Sayer | 425/542 |
| 4,855,094 | 8/1989 | Hendry | 264/40.3 |
| 4,917,594 | 4/1990 | Gellert et al. | 425/549 |
| 4,943,407 | 7/1990 | Hendry | 264/572 |
| 4,944,910 | 7/1990 | Hendry | 264/572 |
| 5,028,226 | 7/1991 | De'Ath et al. | 425/130 |
| 5,030,076 | 7/1991 | Ebenhofer et al. | 425/130 |
| 5,044,924 | 9/1991 | Loren | 425/542 |
| 5,049,056 | 9/1991 | Baxi et al. | 264/572 |
| 5,080,570 | 1/1992 | Baxi et al. | 425/130 |
| 5,098,637 | 3/1992 | Hendry | 264/572 |
| 5,106,283 | 4/1992 | Sauer et al. | 425/130 |
| 5,110,533 | 5/1992 | Hendry | 264/572 |
| 5,135,703 | 8/1992 | Hunerberg et al. | 264/572 |
| 5,151,278 | 9/1992 | Baxi et al. | 425/130 |
| 5,162,122 | 11/1992 | Loren | 264/572 |
| 5,164,200 | 11/1992 | Johnson | 425/130 |
| 5,198,238 | 3/1993 | Baxi | 425/130 |
| 5,256,047 | 10/1993 | Moldovanyi | 425/130 |
| 5,282,730 | 2/1994 | Daniels et al. | 425/130 |
| 5,284,429 | 2/1994 | Schneider et al. | 425/130 |
| 5,302,339 | 4/1994 | Baxi et al. | 264/572 |
| 5,342,191 | 8/1994 | Shah et al. | 425/533 |
| 5,354,523 | 10/1994 | Shah | 264/28 |
| 5,505,891 | 4/1996 | Shah | 264/28 |
| 5,545,027 | 8/1996 | Kaneishi et al. | 425/546 |

*Primary Examiner*—Patrick Ryan
*Assistant Examiner*—Joseph Leyson

[57] ABSTRACT

Mold bushings or nozzles for gas-assisted injection molding processes are disclosed. The devices include movable shut-off mechanisms which selectively facilitate or prevent the passage of molten plastic material into mold cavities. One or more apertures, such as holes, openings, channels, slits, slots, and the like, are provided at or adjacent the end of the pin members or at the end of the devices. The apertures are thin or small and have dimensions which will allow the passage of gas and at the same time prevent the plastic material from plugging or clogging them.

10 Claims, 6 Drawing Sheets

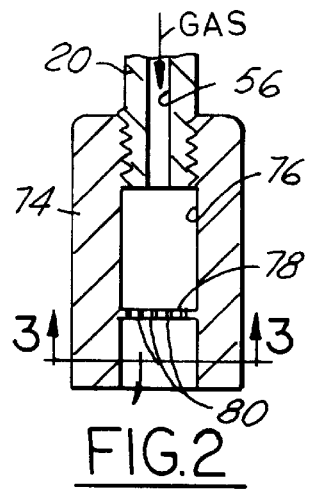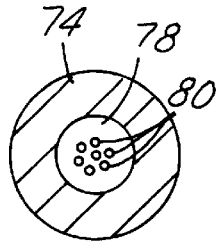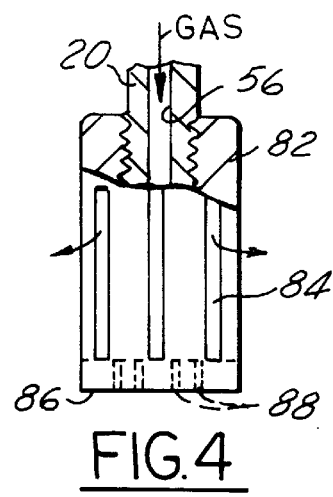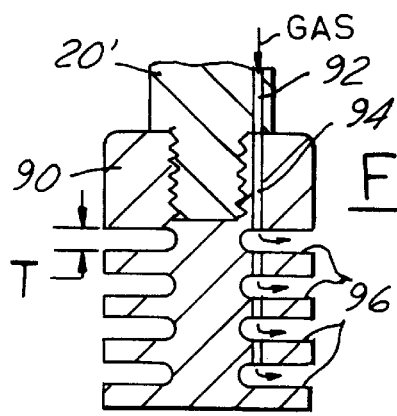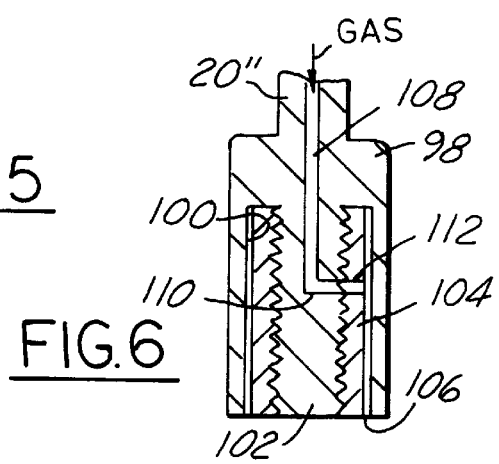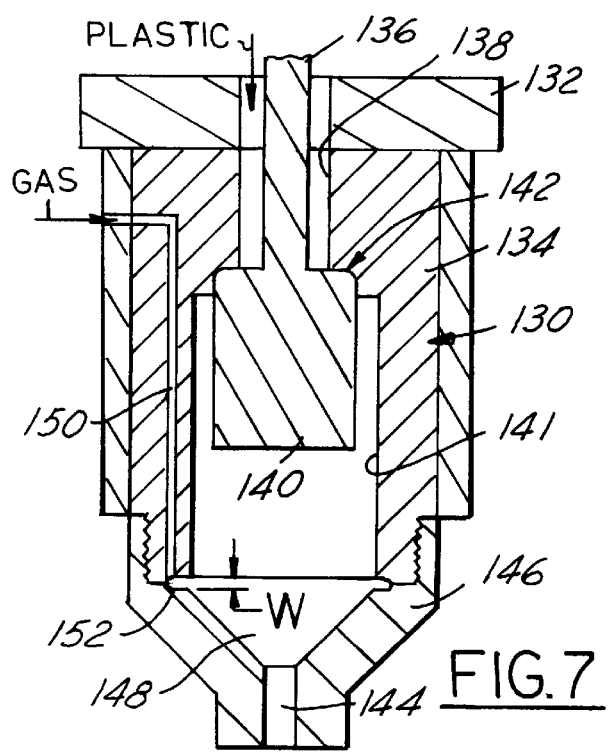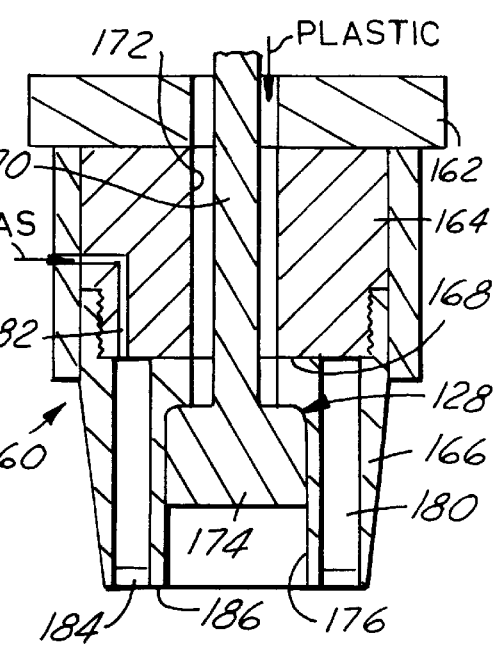

VALVE-GATE BUSHING FOR GAS-ASSISTED INJECTION MOLDING

TECHNICAL FIELD

The present invention relates to devices, such as mold bushings or nozzles, for gas-assisted injection molding systems.

BACKGROUND ART

There are many processes and techniques today for gas-assisted injection molding. Gas-assisted injection molding processes have added new flexibility to the design and manufacture of plastic parts with their ability to produce partially hollow, lightweight, rigid parts with minimal sink marks and less tendency to warp. These processes can reduce material requirements, as well as equipment costs and cycle time, and thus have advantages over conventional injection molding processes and techniques in many applications.

In general, gas-assisted injection molding systems utilize a fluid or gas, such as nitrogen, under pressure to expand the plastic material in the mold and conform it to the mold cavity details. The fluid or gas can be introduced into the mold in several ways, such as through a bushing, nozzle, or machine nozzle in one or more cavities, or in more than one location.

With gas-assisted injection molding techniques, care must be taken to ensure that the gas delivery orifices into the mold do not become plugged or clogged with plastic material and, at the same time, it is necessary that the gas be directed into the mold cavity and not back into the bushing, runner system, or plastic injection system.

SUMMARY OF THE INVENTION

It is an object of the present invention to provide an improved nozzle or bushing for use with a gas-assisted injection molding process. It is also an object of the present invention to provide an improved gas-assist bushing or nozzle for introduction of plastic material and gas into one or more cavities and at one or more locations.

It is another object of the present invention to provide an improved valve-gate bushing or nozzle for use with a gas-assisted injection molding process. It is a further object of the present invention to provide a nozzle or bushing with a movable gate pin which can close off the entry of plastic material into the mold, and at the same time allow entry of gas therein.

It is a still further object of the present invention to provide a gas-assisted injection molding system having orifices or openings into the mold cavity which do not become plugged or clogged with plastic material and which prevents the gas from entering back into the bushing, runner system, or plastic source.

The present invention overcomes prior difficulties with valve-gate type bushings or nozzles and fulfills the objects and purposes noted above. The present invention provides a pin-type valve-gate device which effectively blocks off the flow of plastic material into the mold as desired, allows the entry of the gas into the mold cavity, prevents the plastic material from plugging or clogging the gas orifices, and prevents the gas from flowing or entering back into the bushing and plastic material supply.

In particular, the bushing preferably includes a movable shut-off pin mechanism which selectively allows plastic material to enter the mold cavity and at the same time has a series of small slits, apertures or openings in the pin, body or components which allow gas or fluid to pass therethrough, but are too small to allow plastic material from entering. The small slits or openings can be positioned to allow gas flow in an axial direction, in a direction transverse to the longitudinal axis, or both. The slits or openings can be produced by machining techniques, or by a combination of parts with predefined spaces between them, and can have diverging, converging or parallel cross-sections. The slits or openings also can be used to exhaust the gas or fluid from the part cavity after the injection process is complete.

These and other objects, purposes, benefits and advantages of the present invention will become apparent from the following detailed description of the invention, when taken together in view of the accompanying drawings and appended claims.

BRIEF DESCRIPTION OF THE DRAWINGS

FIGS. 2–6 illustrate various embodiments of pin members in accordance with the present invention;

FIGS. 7 and 8 illustrate two other embodiments of the invention;

DESCRIPTION OF THE PREFERRED EMBODIMENTS

Figures 1, 1A:
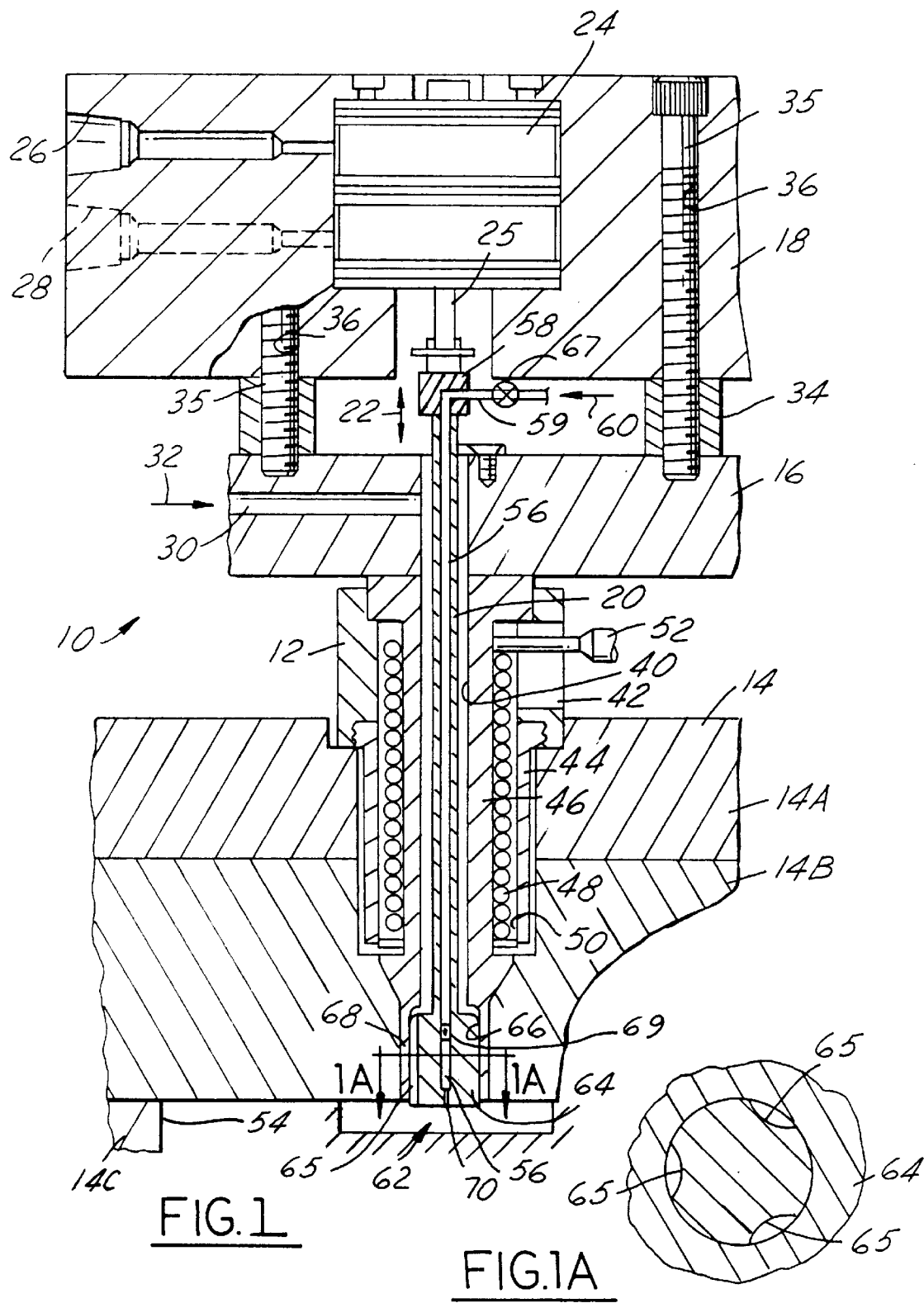
FIG. 1 illustrates a valve-gate bushing incorporating one embodiment of the present invention.
FIG. 1A is a cross-sectional view of the head of the pin member shown in FIG. 1 with the cross-section being taken along line 1A—1A in FIG. 1 and in the direction of the arrows.

FIG. 1 illustrates one embodiment of the present invention and shows its use in a typical injection molding environment. The present invention is particularly adapted to be used in a gas-assisted injection molding process or system. In this regard, the use of the term "gas" throughout this document is not meant to be limiting. The invention can be used with fluids of all types, whether in the gaseous or liquid states.

Also, the present invention can be used with bushings or nozzles of all types for gas-assisted injection molding techniques, including sprue bushings and machine nozzles.

The valve-gate system is referred to generally by the reference numeral 10 in the drawings. In this regard, the system 10 includes a bushing or nozzle 12, a manifold 16, and a cylinder block or housing plate 18. The mold bushing 12, which is also commonly referred to as a "nozzle," is mounted in a mold 14 and has a central movable pin member 20. The pin 20 is movable in the direction shown by the arrows 22 and is operated by a motor 24 which is positioned in the cylinder block 18. In this regard, motor 24 can be either electrical, pneumatic, or hydraulic, and channels 26 and 28 are provided in the cylinder block for entry of the gas, fluid, or electrical leads as appropriate for operation of the motor.

The manifold 16 is heated by any conventional means, such as cartridge heaters (not shown), and includes a channel or passageway 30 for entry of the plastic material from the injection molding machine (not shown) to the bushing 12. In this regard, the direction of flow of the plastic material is indicated by the arrow 32. Pillars or spacers 34 are positioned between the manifold 16 and cylinder block 18. The cylinder block, manifold and mold are typically secured or fastened together by any appropriate means, such as clamps, machine bolts, or the like. In this regard, pins or bolts 35 can be positioned in channels 36 in order to align and hold the cylinder block 18 and manifold 16 together.

The bushing or nozzle 12 can be made of one or more pieces as desired. For example, as shown in the embodiment of FIG. 1, the bushing 12 can have a head portion 42 which is threadedly attached to an outer body member 44. The bushing 12 also includes an inner shank or body member 46 which has an internal elongated passageway 40. A heater member 48 is positioned in an annular space 50 between the shank 46 and outer body member 44. The heater member, which preferably is a resistance-type heater, such as a coil heater or band heater of any conventional type, is electrified through lead 52 connected to an appropriate power source (not shown).

As indicated, the bushing can be a one-piece or multi-piece component device. The heater member also can be positioned internally or externally relative to the body. The bushing further can have any convenient or conventional shape or cross-section, and can be provided without a head portion. The bushing further can be of a type which is threadedly attached to the mold or manifold. All of these types of bushings and heater members are known in the art.

The plastic material is melted and initially converted into a molten state in the barrel of an injection molding machine (not shown). The plastic material is then forced into the bushing, or, if a manifold is utilized, into and through the manifold and then into one or more bushings. In this regard, the heaters in the manifold keep the plastic material in the manifold passageways in a molten condition and the heater member (or members) in the bushing maintains the plastic material in the bushing passageway in a molten condition. In this manner, after the injection cycle injects a quantity of plastic material into the mold cavity, the remaining plastic material in the bushing and manifold does not harden or solidify but is retained in a liquid or molten condition ready for the next injection cycle.

The mold 14 has a series of mold plates 14a, 14b and 14c. A part cavity 54 is formed or provided in mold plate 14c. The cavity 54 is formed in the size and shape of the desired part to be produced by the injection molding process.

The pin member 20 is hollow with a central passageway 56. The pin 20 is connected to the shaft 25 of the motor 24 by an appropriate coupling 58. Gas or fluid is introduced into the mold cavity 54 through passageway 56 in the pin 20. The gas is introduced into the system 10 from a conventional pressure source (not shown) to the coupling 58 by conduit 59. The direction of entry of the gas into the system 10 is shown by the arrow 60. The gas is introduced through the coupling 58 and in turn through the pin 20 and into the mold cavity.

The orifice or gate of the valve bushing is indicated by the reference numeral 62. The valve gate device includes an enlarged head member 64 on the lower end of the pin member 20 and a mating valve seat 66 in the lower end 68 of the bushing 12. Although one particular size and shape of valve head member and valve seat are shown in FIG. 1, it is understood that the particular structure shown is only representative or illustrative and is used simply to explain the present invention. In practice, any size and shape of valve head/seat mechanism can be utilized.

The head member 64 preferably has one or more channels, scollops or "flats" 65 spaced around its outer periphery. These allow the passage of plastic material into the mold cavity 54 when the valve gate is open. Although three channels 65 are shown in FIG. 1A, it is understood that any number can be provided, and the channels can have any desired size and shape.

When the system 10 shown in FIG. 1 is used, the orifice or gate 62 is initially opened, as shown generally in FIG. 1. In this condition, plastic material which is present in the manifold 16 and bushing 12 is allowed to enter into the mold cavity 54. Once the requisite amount of plastic material is introduced into the mold cavity, the motor 24 is operated retracting the pin 20 and seating the head member 64 of the pin in the valve seat 66. This closes the orifice 62 and prevents further flow of plastic material into the mold cavity. At this point, or earlier, if simultaneous gas and plastic flow are utilized in the process, gas under pressure is introduced through the central passageway 56 into the mold cavity 54.

In accordance with conventional gas-assisted injection molding processes, the gas or fluid can be introduced into the mold cavity during the flow of plastic into the cavity, after the plastic material has been deposited in the cavity, or in any combination thereof. For example, an initial amount of plastic material could be introduced into the mold cavity, then gas or fluid at a first pressure could be introduced into the cavity—either by itself or together with the remainder of the plastic material, and then the same or a different gas or fluid could be introduced at the same or at a second pressure. The introduction of the gas or fluid(s) into the mold cavity along with or subsequent to the plastic material pushes the plastic material into all of the areas of the mold, completing the filling of the cavity. In this regard, the present invention is adapted to be utilized with any type of gas/fluid-assisted injection molding process or system known or in use today.

Also in accordance with standard gas-assisted injection molding techniques, after the requisite amounts of gas and plastic are inserted into the mold, the pressure of the gas is maintained to compensate for the volumetric shrinkage of the plastic as it cools and solidifies. In this regard, the mold plates are typically cooled by circulation of a coolant through appropriate channels or passageways (not shown) which assists in solidifying the plastic. Once the plastic part in the mold is solidified sufficiently, the gas within the molded part is vented to atmosphere and the part is ejected from the mold cavity. In accordance with the present invention, it is preferred that the gas be vented back through the passageway 56 in the pin member 20. For this purpose, a valve 67 is provided in the gas inlet conduit 59 for venting the returning gas. Other conventional methods could be used to vent the gas from the mold part, however, such as a vent pin mechanism in the mold or by backing the machine nozzle away from the mold.

The gas which can be utilized with the present invention is preferably nitrogen, but it can be any other conventional gas or fluid utilized with other gas-assisted injection molding processes. Also, if desired, the gas being removed or vented from the mold after the molding cycle, can be collected, reclaimed and reused. In this regard, it is preferable to provide a filter or filter mechanism in the gas return or exhaust passageway in order to remove any foreign or plastic particles.

A filter or filter mechanism, of any conventional type, should also be added to the intake passageway or inlet of the gas or fluid into the pin passageway and/or mold. For example, a representative filter 69 is shown in FIG. 1. This will help prevent blockages in the gas passageway.

The size or diameter of the passageway 56 in the pin member 20 depends in particular on the viscosity of the plastic material that is to be utilized in the injection molding process. The size of the opening 70 at the end of the passageway into the mold cavity has to be sufficiently small such that plastic material introduced into the mold cavity 54 will not enter into the passageway 56 and plug or clog the passageway. In this regard, openings having a diameter between 0.0025 inches–0.003 inches and between 0.003 inches–0.005 inches can be used, depending on the application and plastic material utilized. Preferably, in accordance with the present invention, the openings should be in the range from 0.0001 inches to 0.0100 inches.

The opening or aperture 70 in the valve pin member 20 can be formed in any conventional way or by any particular process. The opening can be formed by a machining process such as drilling, by EDM, or by any other process. The pin member 20 is preferably made of a metal material and can be formed by sintered metal or any other means. Also, although one opening 70 is shown in FIG. 1, it is understood that a plurality of openings or holes can be provided in the head member 64 in order to introduce (and exhaust) the gas/fluid into (and from) the mold cavity 54. The sides or surfaces of the openings 70 along their length or extent also can be converging, diverging or parallel. The specific shape selected depends on several factors, such as the speed of introduction of the gas or fluid, the type of gas or fluid, and the injection cycle or process utilized.

Although in the preferred embodiment of the invention the unique bushing is inserted in a mold and controls the passage of plastic material into a mold cavity from either a machine nozzle or manifold, the invention could also be used as part of a multiple or stacked bushing system. For example, a conventional bushing, such as a heated bushing, could be interposed or positioned between the inventive bushing and the mold cavity.

FIGS. 2–6 and 18–19 show alternate embodiments of gas insertion techniques for the end of the pin member 20. In FIGS. 2 and 3, an enlarged end member 74 is attached to the end of the pin member 20. The member 74 can be attached in any conventional manner, such as by welding, brazing, threaded (as shown), etc. The passageway 56 opens into a cavity or bore 76 formed in member 74. A plate or screen member 78 having a plurality of small openings 80 is positioned in the cavity 76. The openings 80 are dimensioned such that a gas or other fluid can easily pass through them, but plastic material cannot.

In FIG. 4, the end member 82 has a plurality of radial slots or slits 84 which communicate with a bore or cavity 56. The slits 84 are sufficiently thin to prevent entry of plastic material and extend longitudinally in the direction of the longitudinal axis of the pin member 20. As a variation of the end member 82 shown in FIG. 4, it is also possible to provide a series of small holes or openings in the distal end 86 of the member 82. These are shown in phantom lines 88 in FIG. 4.

FIGS. 5 and 6 show alternate structures for the end of a pin member. In FIG. 5, the pin member 20' is attached to an enlarged end member 90. A gas passageway 92 in the pin member is in fluid communication with a gas passageway 94 in the end member 90 which in turn is in communication with a series of transverse annular slits 96 formed around the exterior of the member 90. For purposes of illustration, the slits 96 shown in FIG. 5 are shown in an enlarged condition; in practice the slits are thin, having a thickness "T" on the order of about 0.0001 to 0.0100 inches. In FIG. 6, the pin member 20" is formed with an enlarged end 98, an internal annular bore or cavity 100 and a threaded central post member 102 in the cavity. A threaded sleeve member 104 is secured to the post member 102 leaving an annular cylindrically-shaped recess or space 106 for entry of the gas into the mold cavity. Gas passageway 108 in the member 20" has a right angle bend 110 which communicates with short passageway 112 in the sleeve member 104 in order to supply gas to the recess 106. The parts forming the pin structure shown in FIG. 6 are dimensioned such that the thickness of annular recess or space 106 is sufficiently small to prevent plastic material from entering into it from the mold cavity.

The slits or slots in any of the embodiments of the invention shown and described herein can have sides which are converging, diverging, parallel, or any other contour, uniform or random, stationary or moveable. The type selected depends on several factors, including the speed and type of the gas or fluid being utilized with the system.

Figure 18A:
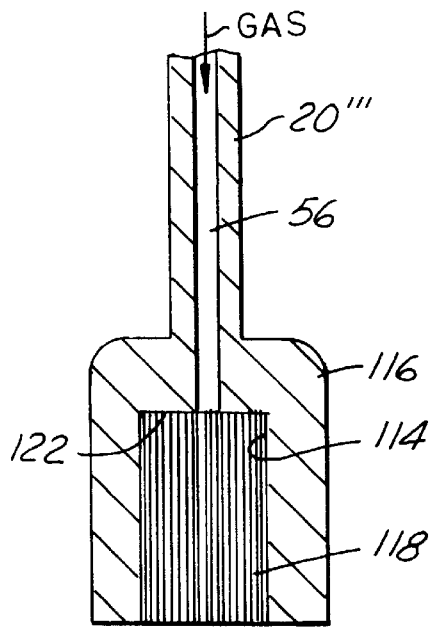
FIGS. 18A–18B, and 19A–19B illustrate still further alternate embodiments of pin members in accordance with the present invention.
Figure 19A:
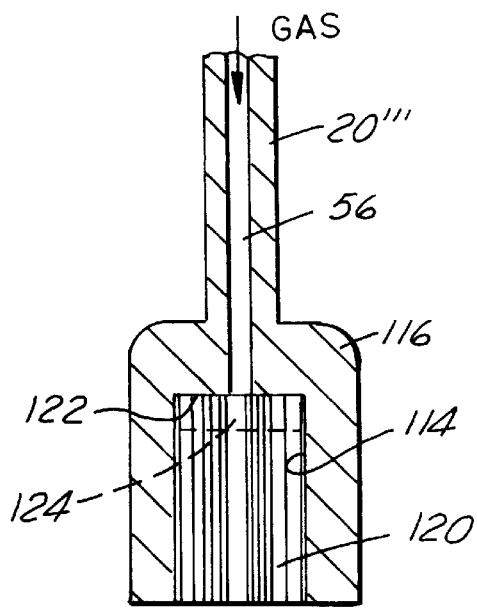
Figure 18B:
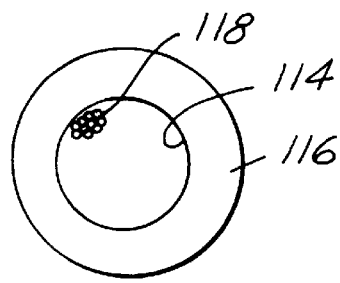
Figure 19B:
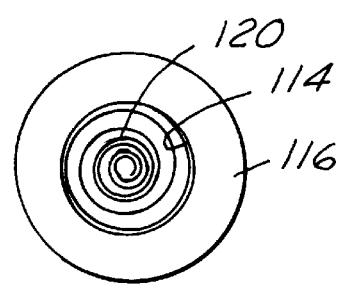

Two additional embodiments for allowing gas to enter a mold cavity through a hollow valve gate pin member are shown in FIGS. 18A–18B and FIGS. 19A–19B. In each embodiment, the pin member 20''' has a central gas passageway 56 which opens into a cavity or bore 114 in the enlarged distal end 116 of the pin member. In FIGS. 18A–18B, a plurality of small rods or wires 118 are tightly wedged or otherwise firmly secured in the cavity 114 completely filling it. The longitudinal spaces between the cylindrically-shaped rods allow gas to flow from passageway 56 into the mold cavity and are sufficiently small to prevent plastic from entering. In FIGS. 19A–19B, a thin strip of metal or similar material 120 is wound into a tight spiral and tightly secured in the cavity 114. The thin spaces between the coils of the spiral allows gas to pass therethrough and into the mold. If desired, it is also possible to provide a space or void between the rods 118 (FIGS. 18A–18B) and spiral 120 (FIGS. 19A–19B) and the end 122 of the cavity 114 which creates a manifold for more even distribution of the gas through the thin spaces and into the mold. In this regard, a representative manifold space 124 is shown in phantom lines in FIGS. 19A.

It is also possible to provide variations of the embodiments shown in FIGS. 18 and 19. For example, rods or wires of different cross-sectional sizes could be used in cavity 114 in FIGS. 18A–18B, or the sizes of the spaces between the rods/wires can be made non-uniform. Also, in FIGS. 19A–19B, the material used for the coil 120 could be temperature-sensitive, thus changing the spacing or gaps between the coil layers depending on the temperature of the plastic material or heat used in the process.

FIG. 7 depicts an alternative bushing structure for use with the present invention. The bushing 130 has an enlarged head 132 and a shank or body member 134. A movable pin member 136 is positioned in central passageway 138 in the bushing body member and has an enlarged distal end member 140 which is positioned in a cavity or bore 141 in the bushing body. The end member 140 acts as a valve member and opens and closes valve orifice 142 in order to facilitate and shut off the flow of plastic material from the passageway 138 into the cavity or bore 141 and in turn through orifice 144 into the mold cavity (not shown). A conventional heater means, such as the heater shown in FIG. 1, is preferably provided around or in the bushing body in order to maintain the plastic material molten in the bushing passageway and cavity 141.

A tip member 146 is threadedly attached to the distal end of the bushing body 134 and forms a conical-shaped cavity or space 148 adjacent the cavity or bore 141. A gas passageway 150 is formed in the bushing body 134 and opens into the edge or intersection 152 between cavity 141 and cavity 148. The intersection 152 is preferably a thin annular slot or slit which is enlarged for illustration in FIG. 7, but in reality has a width "W" on the order of 0.0001 to 0.0100 inches. The annular slot or slit can be machined in one or the other, or both, of the mating surfaces on the end of the bushing body 134 and the tip member 146, or a slight space can be designed to be present between the two members when they are threadedly secured together.

Another alternate embodiment of the present invention is shown in FIG. 8. The bushing 160 has a head member 162, a body or shank member 164, a tip member 166 threadedly attached to the lower or distal end 168 of the body member, and a heater source (not shown) for maintaining the plastic material in the bushing in a molten condition. A movable pin member 170 is positioned in a central passageway 172 in the body member. An enlarged end member 174 on the distal end of the pin member mates with a portion of the central cavity 176 in the tip member 166 and acts as a valve 128 which opens and closes as desired in order to selectively allow or shut off the flow of plastic from passageway 172 into cavity 176 and in turn into the mold cavity (not shown). The tip member 166 has an annular-shaped cavity 180 for assisting in introducing gas into the mold cavity. A gas passageway 182 in the bushing body 164 is in fluid communication with the cavity 180 in order to supply gas from a pressure source (not shown) for use in the gas-assisted injection molding process. A plurality of small slits or openings 184 are provided in the end 186 of the tip member 166 in order to allow the passage of gas from cavity 180 into the mold cavity. As indicated above, the slits or openings—which are described in more detail below with respect to FIGS. 9–13—have a sufficiently small size or dimension in order to not allow the plastic material being injected into the mold from plugging or clogging them.

Figure 9:
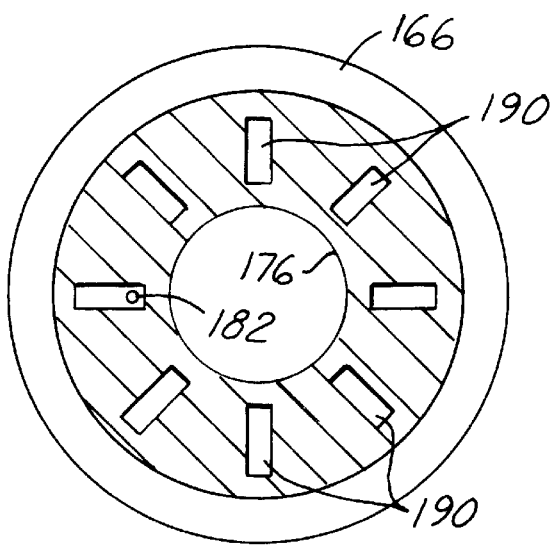
FIGS. 9–13 illustrate various types of openings in the mold bushing mechanism in accordance with the present invention for allowing the passage of gas into the mold cavity.
Figure 10:
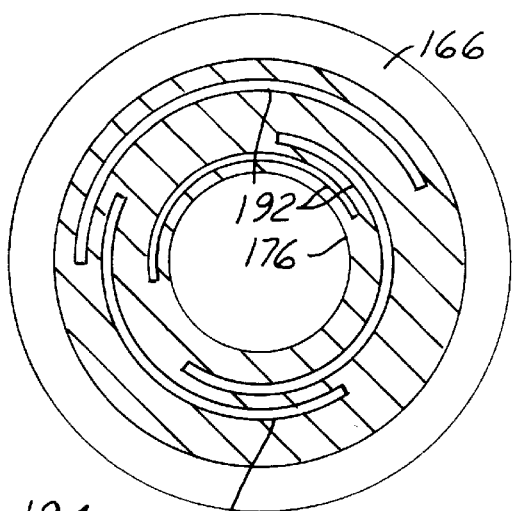
Figure 11:
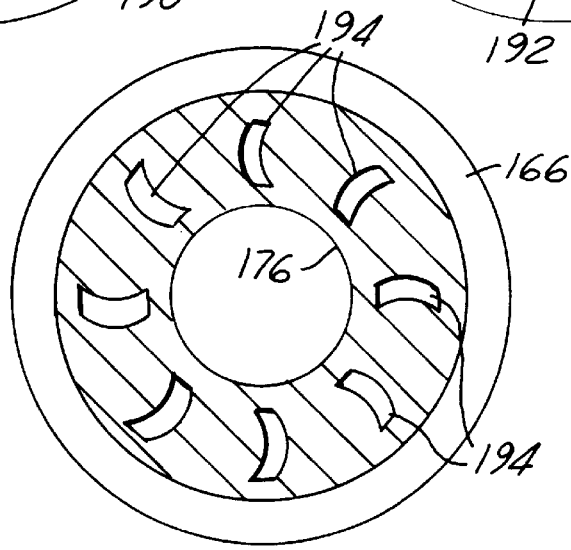
Figure 12:
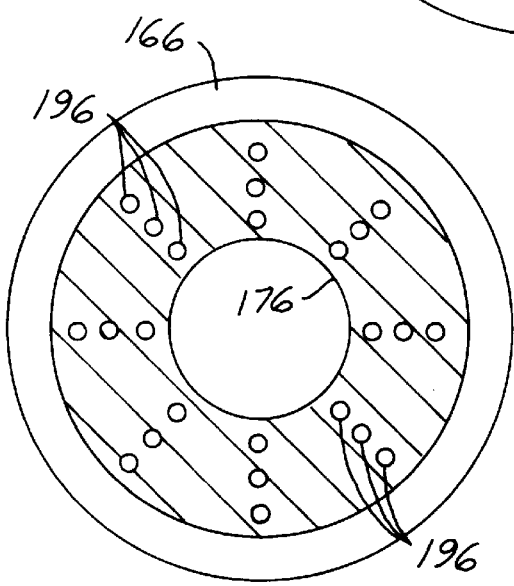
Figure 13:
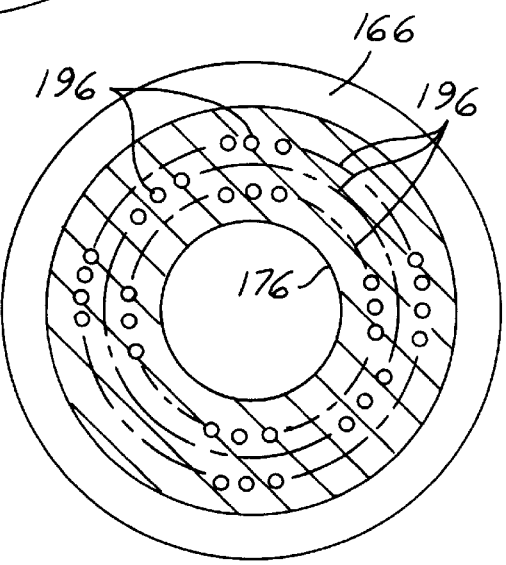

There are numerous alternative designs for the slits or openings in tip member 166 for allowing the gas to pass from cavity 180 into the mold cavity. By way of illustration and not limitation, several of these alternative designs are shown in bottom elevational views in FIGS. 9–13. In FIG. 9, a series of radially-arranged slots or slits 190 are provided. In FIG. 10, a series of generally circular-arc-shaped slits 192 are provided. In FIG. 11, curved generally radially-arranged slits 194 are provided. In FIGS. 12 and 13, a plurality of holes or openings 196 are provided, with many more openings 196 being provided in the embodiment shown in FIG. 13 than in the embodiment shown in FIG. 12. The slits, slots, holes or openings can be formed in the tip members in any conventional manner, such as by drilling, machining, EDM, and the like. Also, the number of openings or slits, and their particular arrangement at the end of the tip member, depends on a number of factors within the discretion and skill of persons skilled in the art (such as the type of plastic material, the viscosity of the plastic material, the pressures of the gas and plastic material, the cycle time and steps, etc.) The openings or slits also could have converging, diverging, or parallel sides or surfaces, as discussed above.

Figure 14:
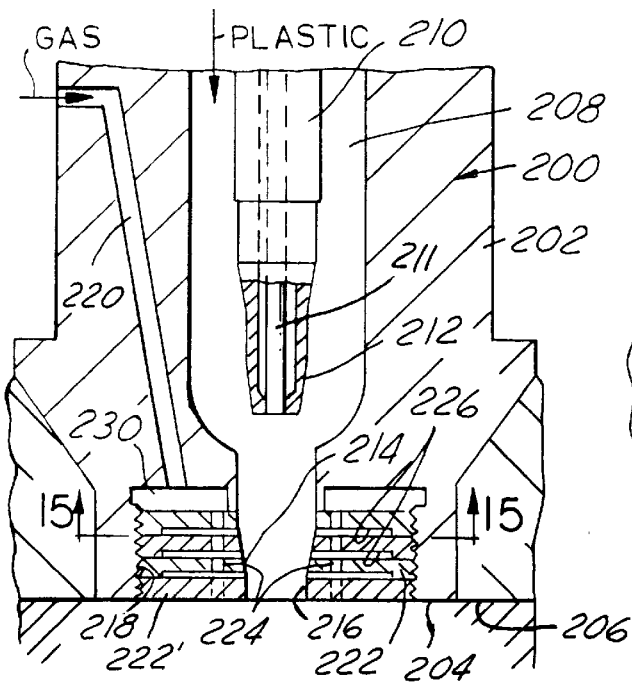
FIGS. 14, 14A and 15 illustrate still another embodiment of the present invention, with FIG. 14A being an enlarged view of a portion of FIG. 14 and with FIG. 15 being a cross-sectional view taken along line 15—15 in FIG. 14 and in the direction of the arrows.
Figure 15:
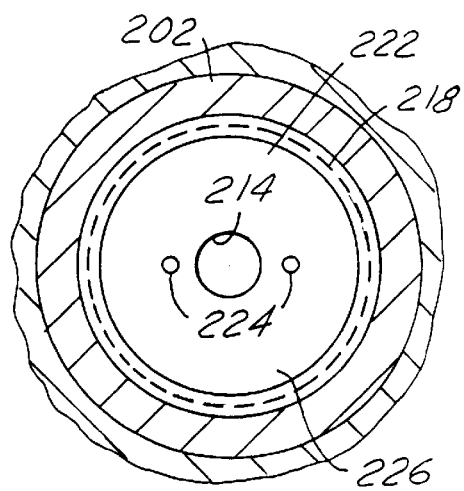

Other embodiments of the invention are shown in FIGS. 14–17. In FIG. 14, the bushing 200 has a shank or body member 202 which has an end 204 which is positioned flush with a wall of the mold 206 and corresponding mold cavity. The body member has a central passageway 208 in which is positioned a movable gate pin member 210. The pin member 210 and bushing body 202 have mating valve gate surfaces 212 and 214, respectively. Axial movement of the pin member 210 by a motor mechanism (such as motor 24 shown in FIG. 1) opens and closes orifice 216 into the mold cavity and thus selectively allows and prevents the flow of plastic material into the mold cavity. The pin and orifice are shown spaced apart in FIG. 14 simply for ease of illustration; in actual practice, the pin and orifice are often situated closer together and the vertical movement of the pin to open and close the valve is on the order of 0.10 to 0.20 inches.

A cavity or threaded bore 218 is provided in the end of the bushing body member 202. A gas passageway 220 provides a source of pressurized gas through the bushing body and into the cavity 218. A plurality of discs or washer members 222—which are better shown in FIG. 15 (enlarged view) and in FIG. 14A (cross-section)—are threadedly secured in the cavity 218.

Figure 14A:
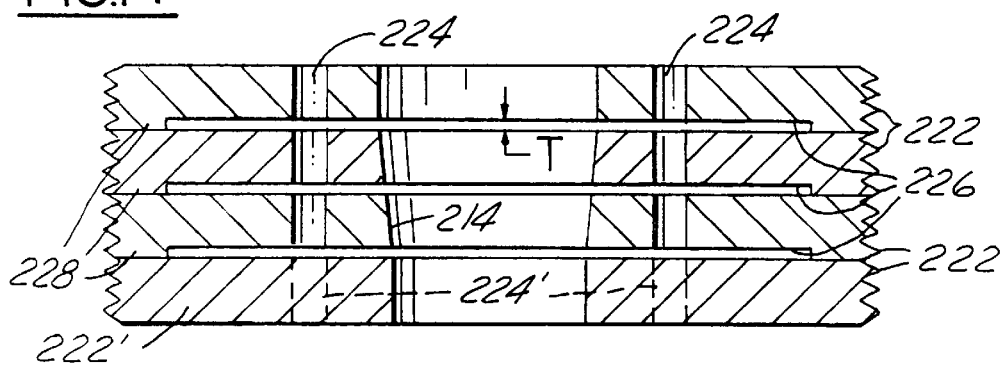

The discs or washers 222 are thin circular plates, preferably of a metal material such as steel, each of which have one or more openings or holes 224 and a recess 226. A ridge of material 228 around the perimeter or edge of the discs allows gas to freely flow into and through the recesses 226. Also, as shown in FIGS. 14 and 14A, the outermost disc or washer 222' is preferably not provided with a corresponding recess or ridge, and also may or may not have any openings or holes 224'. In operation, gas from passageway 220 enters chamber or manifold area 230 and passes through openings 224 in the series of discs 224 and through the recesses 226 into the central passageway 208. (If holes 224' are also provided, then some gas will also flow directly into the mold cavity.)

The recesses 226 are preferably formed as thin slits or slots between the stacked disc members 222 and can be provided in one or both sides of each disc. The thickness "T" of the recesses or slits is preferably the same as the dimension specified above for the thin slits or slots in the other embodiments.

The gas or fluid can be removed or exhausted from the molded part through the same passageways in which it was introduced into the mold cavity. Alternatively, a central movable pin member 211 could be provided in pin member 210 and either moved axially or rotated around its axis in order to release the gas.

Figure 16:
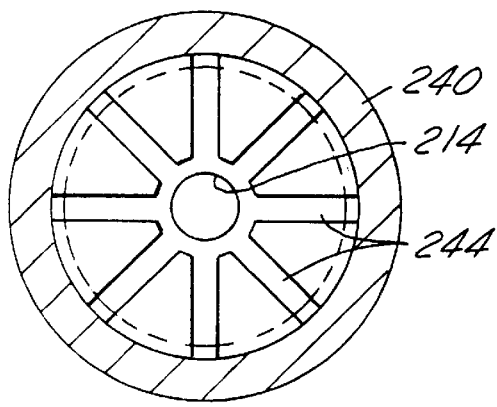
FIGS. 16 and 17 illustrate alternate washer configurations for use with the present invention.
Figure 17:
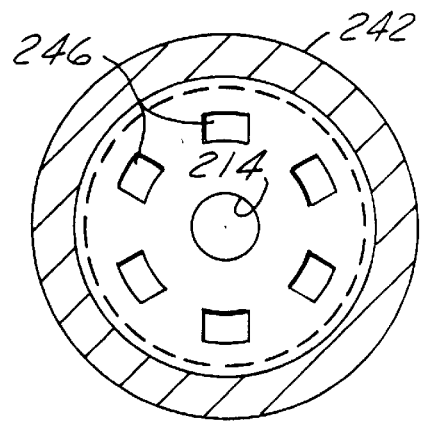

Other embodiments of disc or washer members 240 and 242 which can be utilized with the present invention are shown in FIGS. 16 and 17. In these embodiments, the central recesses or slots are divided into several portions or areas by raised supporting ribs or ridges 244 and 246. The ribs or ridges provide additional supporting structure between adjacent disc members in order to insure that the thin slits or slots are maintained to prespecified dimensions. This allows the desired amount of gas to flow through the standard disc structure and assists the injection molding of the plastic product in the mold cavity.

The ribs or ridges could be formed on the washers by any conventional process. The ribs could be embossed by a stamping or machine forming procedure. The ribs also could be formed by grinding or machining away the areas between them. It is also possible to provide washers with fluted or "wavy" profiles, whether uniform or random.

Figure 20:
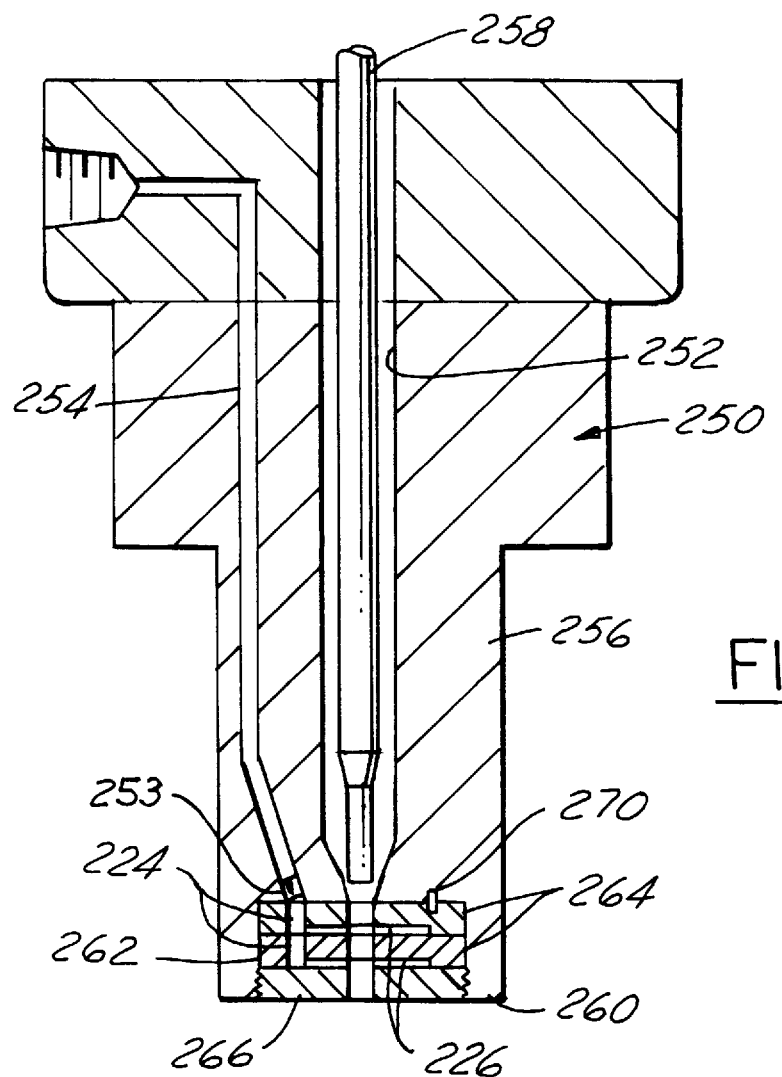
FIG. 20 illustrates the presently preferred embodiment of the invention.

The preferred embodiment of the invention at this time is shown in FIG. 20. A valve gate bushing 250 has a central plastic material passageway 252 and a gas passageway 254 in the body or shank member 256. A movable valve gate pin member 258 is located in the passageway 252. The distal end 260 of the body member has a cavity or bore 262. Two or more disc or washer members 264 are positioned in the cavity 262. These disc members 264 are similar to disc members 222 described above, with at least one axial opening or hole 224 and a central recess 226, but without any external threads. After the disc members 264 are positioned in the cavity 262, a further disc member 266 is threadedly secured into the outer end of the cavity 262 to hold the discs 264 in place.

In order to axially align openings 224 in the disc members 264 and/or to align them with the end of passageway 254, any conventional alignment mechanism or technique can be utilized, such as locating pin or rod 270. As should be clear from the above description of these embodiments of the invention, the number of discs or washer members to be utilized, the number of openings or holes in each disc member, the type of recess or ridges, and the presence or absence of a manifold cavity between passageway 254 and the stacked disc members, depends on the discretion and experience of the operator.

As with the other embodiments described above, the slits or openings in or between the washers could have, depending on the gas and process utilized, converging, diverging or parallel surfaces, and dimensions within the range of 0.0001 to 0.0100 inches. Also, the washers could be formed by embossing, grinding or any other conventional process.

It is also preferred to provided filters in the gas or fluid inlet and outlet passageways in order to provide and/or capture the gas in as clean or pure form as possible. Such a filter is shown, for example, in FIG. 20 and designated by the reference numeral 253. Also, for removal of the gas from the mold cavity, the pin 258 could have a small diameter movable second pin member (similar to pin 211 shown in FIG. 14) positioned inside it. The second pin member could be adapted to be moved axially or rotated around its axis in order to open a passageway for exhaust of the gas.

Figure 21:
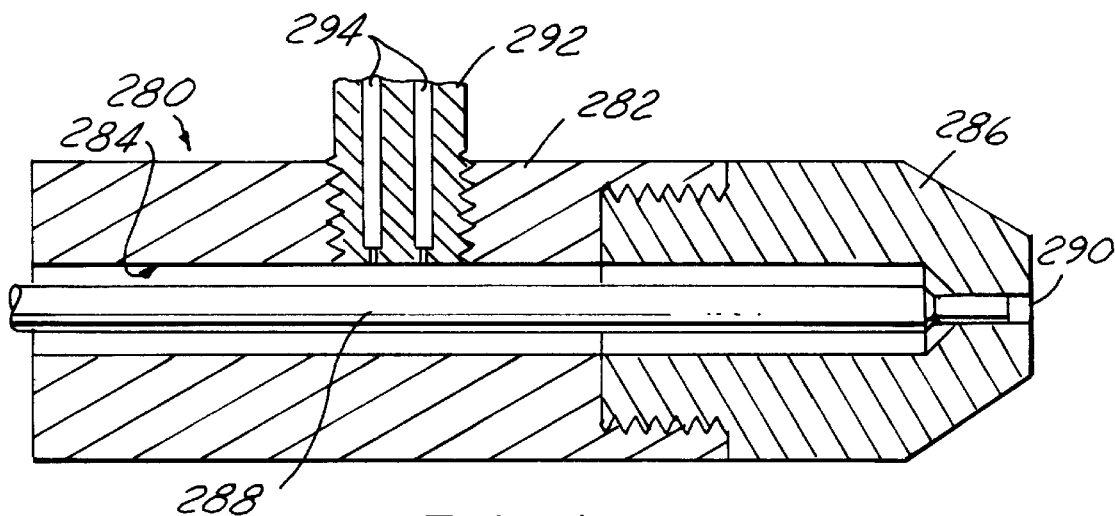
FIG. 21 illustrates a still further embodiment of a novel bushing for a gas-assisted injection molding system.

A still further embodiment of the invention is shown in FIG. 21. In this schematic representation, a bushing 280 has a body member with a central passageway 284, and a tip member 286. The bushing preferably is a valve gate bushing with a movable pin member 288 and gated orifice 290. Gas for the gas-assisted injection molding process is introduced into the central passageway by adapter member or plug 292. The adapter member is connected to a primary gas passageway and source of pressurized gas (not shown).

The adapter member has a plurality of small diameter holes or channels 294 (two being shown by way of example in FIG. 21). Alternately, the channels 294 could be replaced by one annular channel in the adapter 292. The ends of the holes or channels have a size or diameter substantially the same as the gas introduction apertures described above. In this regard, the adapter 292 can be provided with any of the various embodiments and mechanisms described above with respect to allowing entrance of the injection gas into the plastic flow or mold cavity and at the same time preventing back flow, clogging or plugging of the plastic into the openings.

The foregoing discussion discloses and describes exemplary embodiments of the present invention. One skilled in the art will readily recognize from such discussion, and from the accompanying drawings and claims, that various changes, modification and variations may be made therein without departing from the spirit and scope of the invention as defined in the following claims.

What is claimed is:

1. A device for use in gas-assisted injection molding, said device comprising:

a body member having a first inlet end and a second outlet end, a cavity in said second end, and a first central material passageway extending from said first end and opening into said cavity;

a passageway in said body member for said gas, said gas passageway opening into said cavity;

a plurality of thin substantially planer disc members positioned in said cavity;

said disc members each having central apertures therein forming a second central material passageway co-axially with and extending from said first central passageway; and said disc members having longitudinal openings and having radially extending openings therebetween for allowing gas in said cavity to pass into said second central material passageway;

said radially extending openings having a thickness of between 0.0001 to 0.0100 inches and being sufficiently thin to prevent entry of a molten plastic material therein, but having sufficient size to allow passage of gas.

2. The device as set forth in claim 1 wherein said cavity has a manifold space adjacent said disc members.

3. The device as set forth in claim 1 wherein said radially extending openings are thin slit passages.

4. The device as set forth in claim 1 wherein at least one of said disc members has a second aperture therein defining one of said longitudinal openings for passage of gas, said second aperture being positioned radially offset from said central aperture.

5. The device as set forth in claim 1 further comprising a pin member movably positioned in said central passageways for mating with said second central material passageway and acting as a valve member to allow and prevent passage of a molten plastic material through said second central material passageway.

6. The device as set forth in claim 5 further comprising an exhaust member positioned in said pin member for exhausting gas through said pin member.

7. The device as set forth in claim 1 wherein said device is a sprue bushing.

8. The device as set forth in claim 1 wherein said device is a machine nozzle.

9. The device as set forth in claim 1 further comprising a filter member positioned in said gas passageway.

10. The device as set forth in claim 1 wherein at least two of said disc members are provided, at least one of said disc members being threadably received in said cavity.

* * * * *